United States Statutory Invention Registration [19]

[11] Reg. Number: H778

Carlton et al. [43] Published: May 1, 1990

[54] MICROENCAPSULATED CATALYST AND ENERGETIC COMPOSITION CONTAINING SAME

[75] Inventors: Lloyd C. Carlton, Gloucester; Julie A. Finnegan, Newport News, both of Va.

[73] Assignee: The United States of America as represented by the Secretary of the Navy, Washington, D.C.

[21] Appl. No.: 901,063

[22] Filed: Aug. 4, 1986

[51] Int. Cl.[5] ..... C06B 45/10

[52] U.S. Cl. ..... 149/19.2; 149/19.4; 149/19.92; 149/21; 149/92; 428/402.22; 428/402.24; 502/154; 502/152; 502/159; 502/171

*Primary Examiner*—Edward A. Miller

*Attorney, Agent, or Firm*—Robert F. Beers; Thomas E. McDonnell

[57] ABSTRACT

A microencapsulated curing catalyst for a polymer prepared from an isocyanate or functionally terminated polyolefin comprises a catalyst selected from the group consisting of ferric acetylacetonate, dibutyltin dilaurate, the catalyst having a particle size of less than 50 micrometers, and an encapsulating material selected from the group consisting of a copolymer of ethylene and vinyl acetate, a copolymer of propylene and vinyl acetate, and mixtures thereof.

19 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROENCAPSULATED CATALYST AND ENERGETIC COMPOSITION CONTAINING SAME

BACKGROUND OF THE INVENTION

The invention pertains generally to catalysts and in particular to encapsulated cure catalysts.

Thermoplastic polymers cure via one or more chemical reactions whose rate determines both the pot life and the cure time. Consequently, a lengthy pot life results in a lengthy cure time, thereby necessitating increased heating and a long overall processing time. If a cure catalyst is added, then the pot life shortens and serious processing problems can arise.

One application for thermoplastic polymers where this dilemma is causing unacceptable difficulties is PBX explosives (plastic bonded explosives) which comprise a thermoplastic binder and one or more high-energy materials. In contrast to melt-cast explosive systems which solidify upon casting and cooling, the PBX explosives require a large amount of curing space or holding area.

Encapsulation has been used to delay the reactivity or activity of one or more ingredients in energetic compositions. Glass microspheres are used to isolate one ingredient of a Sprengel explosive in U.S. Pat. No. 3,797,392. The initiation of the detonation cracks the glass microspheres and allows the entire explosive to detonate. In U.S. Pat. No. 3,507,719 and 3,388,554 by James E. Hodgson, particles of a metal fuel are encapsulated in order to hold them in a stable suspension in solid propellants. A liquid explosive is sensitized, in U.S. Pat. No. 3,713,915 by C. R. Fast, by the addition, just prior to use, of a sensitizing agent encapsulated with cellulose acetate, cellulose triacetate, polyvinyl chloride or polyvinyl acetate. The encapsulation material is soluble in nitromethane, causing the release of the sensitizing agent in a short time after the addition. The curing agent and liquid prepolymer for a flare composition are encapsulated with a crushable material in U.S. Pat. No. 3,728,172 by Dillehay et al. The ingredients are put into the flare container and a rupturing pressure is applied, causing the liquid prepolymer to polymerize and forming the flare.

To date, encapsulation has not been successfully used to improve the processing of plastic bonded explosives. The encapsulation material must be inert with the encapsulated material but it must also be either soluble in or reactive with one or more ingredients in the PBX explosive. Of course the degree of solubility or reactivity is equally important because the encapsulated ingredient must be released at the correct time, neither too soon nor too late.

SUMMARY OF THE INVENTION

It is, therefore, an object of this invention to formulate PBX explosives with an acceptable pot life and cure time.

Another object of this invention is to encapsulate a cure catalyst suitable for curing isocyanate or functionally terminated polyolefin prepolymers.

A further object of this invention is to encapsulate a cure catalyst with a material soluble or partially soluble in one or more of the prepolymers of a polymeric binder.

These and other objects are achieved by encapsulating a cure catalyst for a polymer system prepared from a diisocyanate or a functionally terminated polyolefin with a coating at least partially soluble in one or more of the polymer reactants and inert with the catalyst. The thickness of the encapsulating material is sufficient to withstand processing but thin enough to dissolve in a practical amount of time.

DETAILED DESCRIPTION OF THE INVENTION

The encapsulation material found to be sufficiently soluble in diisocyanates or a functionally terminated polyolefins, especially functionally terminated polybutadiene, is either a copolymer of ethylene and vinyl acetate wherein the weight percentage of ethylene is from about 55 to about 70 percent or a copolymer of propylene and vinyl acetate wherein the weight percentage of propylene is from about 55 to about 70 percent. The preferred weight percentage of ethylene or propylene in the copolymer is from 58 to 68 percent. Most preferably the copolymer chain length is such to give a melt index of 40 to 60.

The average thickness of the coating is generally from about 0.7 to about 2.0 times the radius of the average catalyst particle. This range ensures that the encapsulation layer remains intact during processing, but the catalyst begins to be released without an undue delay. The preferred thickness is from 0.8 to 1.2 times the average catalyst-particle radius.

The preferred average particle size, i.e., diameter, of the catalyst is less than about 50 micrometers. Average particle sizes that are larger than 50 micrometers can be used, but the homogeneity of the cure is lessened. The most preferred particle range is from 35 to 50 micrometers. Thus the composite of the present invention generally has an average particle size of less than about 120 micrometers and preferably from 65 to 90 micrometers.

The only requirements in the selection of a catalyst are that the catalyst is, in fact, a catalyst for the binder system and the catalyst is inert with the encapsulating material. Suitable catalysts include ferric acetylacetonate, dibutyltin dilaurate, and mixtures thereof.

The catalyst particles can be encapsulated in any manner so long as the requisite thickness is obtained. If the catalyst is a liquid, the encapsulation methods described in U.S. Pat. Nos. 2,969,331 and 2,800,458 can be used. The methods described in U.S. Pat. Nos. 3,264,038 and 3,302,977 can be used for solid particles of catalyst.

The immediate application for the subject invention is in the processing of PBX compositions with a polymeric binder prepared from an isocyanate and/or a functionally terminated polyolefin. Generally the polymeric binder comprises from about 12 to 20 weight percent of the total composition weight. A preferred PBX binder is prepared from a polymeric binder premix that comprises, based on total premix weight, a diisocyanate, preferably isophorone diisocyanate, a hydroxy-terminated polybutadiene wherein the OH to NCO equivalent ratio of the polybutadiene to diisocyanate is about 1:1, a plasticizer in an amount up to 80 weight percent of said polybutadiene, and a catalytic amount of a cure catalyst. The preferred plasticizers are dioctyl adipate, dioctyl sebecate, and isodecyl perlargonate. The preferred catalysts are ferric acetylacetonate (FeAA) and dibutyltin dilaurate (DBTDL). In addition to the polymeric binder, a PBX explosive includes a powdered energetic compound, e.g., cyclotetramethylenetetranitramine (HMX) or cyclotrimethylenetrinitramine (RDX) or nitroguanidine (NQ) in an amount from about 60 to 88 weight percent of the total composition weight. Usually the composition further comprises a powdered oxidizer, e.g., ammonium perchlorate (AP), potassium nitrate, or ammonium nitrate in an amount up to about 10 percent of total composition weight, a powdered fuel, e.g., aluminum, magnesium or boron in an amount up to about 20 percent of total composition weight and possibly minor amounts of other ingredients, e.g., a bonding agent or anti-oxidant, e.g., 2,2'-methylene bis(4-methyl-6-tertiarybutyl phenol).

The use of the encapsulated catalyst of this invention does not require any additional processing requirements. Explosives, for example, are processed in the usual manner. A typical processing method comprises admixing the binder reactants with the subject encapsulated cure catalyst, admixing in the energetic compounds, admixing in the other ingredients, mixing the entire composition for approximately 20 minutes, and pouring the composition into trays for curing in a heated compartment at about 35° to 70° C.

Having described the invention, the following examples are given to illustrate the practice and the advantages of the invention. It is understood that the examples are given by way of illustration and are not meant to limit this disclosure or the claims to follow in any manner.

EXAMPLE I

Solubility of Copolymer of Ethylene (60) and Vinyl Acetate (40)

Several particles of ferric acetylacetonate (FeAA) that had been encapsulated with a copolymer of ethylene (60 weight percent) and vinyl acetate (40 weight percent) were placed in beakers of isophoronediisocyanate, hydroxy-terminated polybutadiene, and dioctyl adipate. In about three (3) hours, at 60° C., the contents of the beakers had turned a rust color, indicating that the encapsulation material had at least partially dissolved.

EXAMPLE II

Solubility of Copolymer of Ethylene (67) and Vinyl Acetate (33)

The test of Example I was repeated for ferric acetylacetonate that had been encapsulated with a copolymer ethylene (67 weight percent) and vinyl acetate (33 weight percent). In about three (3) hours, the dioctyl adipate and hydroxy-terminated polybutadiene had turned a rust color, but the diisocyanate did not. This change in result with an increase in the nonpolar constituent of the copolymer is evidence that solvation is the mechanism by which the subject invention operates.

EXAMPLE III

PBX Composition with an Encapsulated Catalyst

A PBX composition was prepared by mixing 50.0 grms of hydroxy-terminated polybutadiene, 7.6 grms of isophorone diisocyanate, 32.4 grms of dioctyl adipate, 0.06 grms of a coated catalyst of Example II (an amount that is approximately 1-5 times the usual amount). After mixing was completed (EOM), the PBX composition was poured on a tray and placed in an oven at 60° C. viscosity measurements were taken every hour to determine pot life. The maximum acceptable viscosity for the working life of this system is defined as 2,000,000 centipoise. The degree of cure was determined by taking Shore-A measurements every 24 hours after the end of mixing. The minimum requirement is a Shore-A measurement of 30 with a 30-second delay. The results of the measurements are summarized and compared with those of Example IV in Tables I and II.

EXAMPLE IV

PBX Composition with an unencapsulated Catalyst

The PBX composition of Example III was prepared with two changes: the cure catalyst was not encapsulated and its amount was the usual amount. The testing proceeded as in Example III and the results are summarized and compared with those of Example III in Tables I and II.

TABLE I

| VISCOSITY, CENTIPOISE AT 60° C. (U) | | |
|---|---|---|
| Hrs after EOM | III | IV |
| 0 | 352,000 | 352,000 |
| 1 | 576,000 | 1,232,000 |
| 2 | 960,000 | >3,200,000 |
| 3 | 1,376,000 | — |
| 4 | 2,240,000 | — |

TABLE II

| SHORE-A HARDNESS (30-SECOND DELAY) AT 60° C. (U) | | |
|---|---|---|
| Hrs after EOM | III | IV |
| 24 | 14 | 23 |
| 48 | 25 | 26 |
| 72 | 30 | 35 |
| 96 | 37 | 41 |
| 120 | 41 | 43 |
| 144 | 41 | 48 |
| 168 | 45 | 49 |
| 192 | 45 | 49 |

EXAMPLE V

Density

The density of the PBX in Example III was 1.65 g/cc, which is within the material specification for this PBX composition.

The above results conclusively show that the use of encapsulated FeAA rather than unencapsulated FeAA increases the pot life of the PBX composition without adversely affecting the cure time. The amount of increase allows the amount of the catalyst to be increased at least 50 percent, thus allowing the cure time to be significantly reduced. The physical properties of the explosive are comparable to those of the conventionally cured PBX explosives and are well within specification.

Obviously, many modifications and variations of the present invention are possible in light of the above teachings. It is therefore to be understood that, within the scope of the appended claims, the invention may be practiced otherwise than as specifically described.

What is claimed is:

1. An encapsulated curing catalyst which comprises:

a catalyst selected from the of ferric acetylacetonate, dibutyltin dilaurate and mixtures thereof, said catalyst having an average particle size of less than about 50 micrometers;

a coating selected from the group consisting of a copolymer of ethylene and vinyl acetate wherein the weight percentage of ethylene is from about 55 to 70 percent, a copolymer of propylene and vinyl acetate wherein the weight percentage of propylene is from about 55 to 70 percent, and mixtures thereof, said coating having an average thickness from about 0.7 to 2 times the average radius of said catalyst.

2. The encapsulated curing catalyst of claim 1 wherein said catalyst is ferric acetylacetonate.

3. The encapsulated curing catalyst of claim 1 wherein said coating is said copolymer of ethylene and vinyl acetate.

4. The encapsulated curing catalyst of claim 3 wherein said catalyst is ferric acetylacetonate.

5. The encapsulated curing catalyst of claim 2 wherein said coating has an average thickness from 0.8 to 1.2 times the average radius of said catalyst.

6. The encapsulated curing catalyst of claim 3 wherein said coating has an average thickness from 0.8 to 1.2 times the average radius of said catalyst.

7. The encapsulated curing catalyst of claim 4 wherein said coating has an average thickness from 0.8 to 1.2 times the average radius of said catalyst.

8. The encapsulated curing catalyst of claim 6 wherein the weight percentage of ethylene in said copolymer is 58 to 68 percent.

9. The encapsulated curing catalyst of claim 7 wherein the molar percentage of ethylene in said polymer is 58 to 68 percent.

10. The encapsulated curing catalyst of claim 8 wherein the average particle size is from 35 to 50 micrometers.

11. The encapsulated curing catalyst of claim 9 wherein the average particle size if from 35 to 50 micrometers.

12. A method for the preparation of an explosive which comprises:

admixing binder reactants with an encapsulated cure catalyst, said cure catalyst comprising a catalyst selected from the group consisting of ferric acetylacetonate, dibutyltin dilaurate and mixtures thereof, said catalyst having an average particle size of less than about 50 micrometers; and adding an energetic compound to said binder reactants.

13. The method of claim 12 wherein said binder reactants comprise a diisocyanate, hydroxy-terminated polybutadiene, and dioctyl adipate.

14. The method of claim 13 which further comprises adding an oxidizer and a fuel along with said energetic compound.

15. An energetic composition which based on total composition weight:

from about 12 to about 20 weight percent of a polymeric binder premix comprising, based on total premix weight, an isocyanate, wherein the OH to NCO equivalent ratio is about 1:1, a hydroxy-terminated polybutadiene, a plasticizer in amount up to 80 weight percent of said polybutadiene, and a catalytic amount of an encapsulated cure catalyst comprising a catalyst selected from the group consisting of ferric acetylacetonate, dibutyltin dilaurate and mixtures thereof, said catalyst having an average particle size of less than about 50 micrometers;

from about 60 to about 88 weight percent of an energetic compound;

from about 0 to 10 weight percent of an, oxidizer; and from about 0 to 20 weight percent of a metal fuel.

16. The energetic composition of claim 15 wherein said isocyanate is isophorone diisocyanate.

17. The energetic composition of claim 16 wherein said energetic compound is selected from the group consisting of cyclotetramethylene tetranitramine, cyclotrimethylenetrinitramine, nitroguanidine, and mixtures thereof; said oxidizer is selected from the group consisting of ammonium perchlorate, potassium or ammonium nitrate, and mixtures thereof; and said fuel is selected from the group consisting of aluminum; magnesium, boron, and mixtures thereof.

18. The energetic composition of claim 17 wherein the average particle size of said catalyst is from 35 to 50 micrometers and the average thickness of said coating is from about 0.8 to 1.2 times the average radius of said catalyst.

19. The energetic composition of claim 18 wherein said coating is a copolymer of ethylene and vinyl acetate, said ethylene comprising from about 55 to 70 percent of the total copolymer weight.

* * * * *